United States Patent [19]

Backlund et al.

[11] Patent Number: 4,482,113
[45] Date of Patent: Nov. 13, 1984

[54] INTEGRATED PARATROOP DOOR

[75] Inventors: John G. Backlund, Huntington Beach; David L. Gibler, Rancho Palos Verdes, both of Calif.

[73] Assignee: The United States of America as represented by the Secretary of the Air Force, Washington, D.C.

[21] Appl. No.: 586,893

[22] Filed: Mar. 13, 1984

Related U.S. Application Data

[63] Continuation-in-part of Ser. No. 336,473, Dec. 31, 1981, abandoned.

[51] Int. Cl.$^3$ .............................. B64C 1/24; B64C 1/14
[52] U.S. Cl. .............................. 244/129.5; 244/129.6; 280/166
[58] Field of Search ............... 244/129.5, 129.6, 129.4, 244/118.3; 296/146; 49/70; 105/447, 427, 437, 430, 443, 445; 182/48, 77, 78; 280/166; 211/150, 171

[56] References Cited

U.S. PATENT DOCUMENTS

| | | | |
|---|---|---|---|
| 728,097 | 5/1903 | Gray | 105/430 |
| 1,467,976 | 9/1923 | Gannon | 280/166 |
| 2,409,418 | 10/1946 | Carmichael | 280/166 |
| 2,417,987 | 3/1947 | McFarland | 244/129 |
| 2,763,900 | 3/1956 | McAfee et al. | 20/16 |
| 2,808,257 | 10/1957 | Brookbank | 268/74 |
| 2,951,454 | 9/1960 | Candlin | 105/447 |
| 3,128,068 | 4/1964 | Pauli | 244/129 |
| 4,020,920 | 5/1977 | Abbott | 280/166 |
| 4,032,092 | 6/1977 | Day | 244/137 R |

Primary Examiner—Trygve M. Blix
Assistant Examiner—Rodney Corl
Attorney, Agent, or Firm—Donald J. Singer; Bobby D. Scearce

[57] ABSTRACT

A deployable platform for use in conjunction with an outwardly opening hinged door on the body structure of a vehicle is described which comprises a hydraulically or pneumatically actuated platform pivotally mounted to the vehicle at the doorway opening and connected to the door by an over center linkage member pivotally connected at one end to the door and at the other to the platform whereby the platform may be deployed and releasably locked into place simultaneously with the opening of the door.

2 Claims, 3 Drawing Figures

INTEGRATED PARATROOP DOOR

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is a continuation-in-part of copending application Ser. No. 336,473 filed Dec. 31, 1981, now abandoned.

BACKGROUND OF THE INVENTION

This invention relates generally to the field of door structures for vehicles, and, more particularly, is directed to an improved door structure for aircraft comprising a hinged door in combination with a hydraulically or pneumatically operated extensible platform which is deployable simultaneously with the opening of the aircraft door, and is suitable as a jump platform for paratroops.

Large cargo and troop transport aircraft, such as the YC-15, C-15A, etc., finding substantial military use, include in the aft portion of the fuselage one or more hinged doors for pedestrian access to the aircraft. These doors also find use for the inflight exit of paratroops during military related missions. Existing aircraft doors of this general type may have adjacent thereto an extensible wind screen to control the airflow past the door opening, and a separate jump platform may be provided at the opening to assist the jumper. In existing aircraft, the door, jump platform and wind screen conventionally are independent systems, each requiring its own activating and latching means.

The novel integrated paratroop door of the present invention provides an inexpensive integrated system for deploying a jump platform simultaneously with the outward opening of the aircraft door. The door may be configured to conform along its forward edge with the contour of the fuselage to provide an effective wind screen for the door opening and deployed jump platform. In a preferred embodiment, the present invention comprises an outwardly opening door having multiple hinges on its forward edge. A hydraulically or pneumatically operated jump platform is pivotally mounted near each side of the frame defining the door opening and connected to the inner surface of the door with a hinged over center link. When fully extended, the platform is releasably locked into place by operation of the over center link, is preferably substantially coplanar with the aircraft cabin floor, and extends beyond the outer contour of the aircraft fuselage adjacent the door opening. The hydraulic or pneumatic deploying means for the platform may be configured to be bypassed for manual operation, such as when the aircraft is on the ground or when hydraulic or pneumatic power is not otherwise available. The door may be secured in its closed position by conventional mechanical latching bayonets.

The invention herein described therefore provides a novel integrated aircraft door and jump platform which may improve total aircraft reliability and reduce acquisition and maintenance costs.

It is, therefore, an object of this invention to provide a novel integrated aircraft door and jump platform.

It is a further object of this invention to provide a hydraulically or pneumatically actuated, integrated aircraft door, jump platform and wind screen.

These and other objects of the present invention will become apparent as the detailed description of representative embodiments thereof proceeds.

SUMMARY OF THE INVENTION

In accordance with the foregoing principles and objects of the present invention, a deployable platform for use in conjunction with an outwardly opening hinged door on the body structure of a vehicle is described which comprises a hydraulically or pneumatically actuated platform pivotally mounted to the vehicle at the doorway opening and connected to the door by an over center linkage member pivotally connected at one end to the door and at the other to the platform whereby the platform may be deployed and releasably locked into place simultaneously with the opening of the door.

DESCRIPTION OF THE DRAWINGS

The present invention will be more clearly understood from the following detailed description of specific representative embodiments thereof read in conjunction with the accompanying drawings wherein.

DETAILED DESCRIPTION

Figure 1:
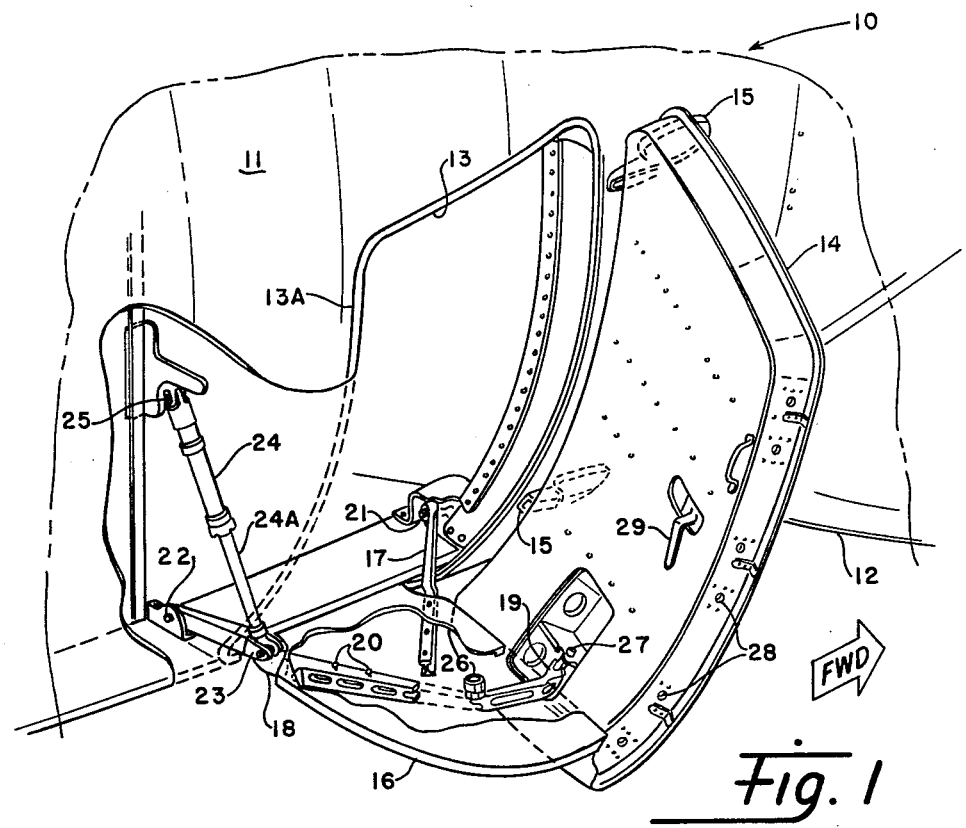
FIG. 1 ia a perspective view of the integrated paratroop door and deployable platform of the present invention incorporated into the fuselage of an aircraft.

Referring now to the drawings, FIG. 1 is a perspective view of the novel integrated paratroop door and jump platform of the present invention incorporated into the fuselage of an aircraft.

As shown in FIG. 1, an aircraft 10 may include fuselage portion 11 and wings 12, both shown partially. Fuselage 11 may be configured to define doorway opening 13 with door frame 13A for receiving door 14 having the appropriate shape to conform to the exterior surface contour of fuselage 11. Door 14 is hinged along its forward edge to fuselage 11 by means of multiple hinges 15 such that door 14 may be opened outwardly and forwardly relative to fuselage 11. The forward edge of door 14 may have the appropriate shape to conform to the outer contour of fuselage 11 when the door is open, thereby providing an effective wind screen for the doorway opening 13.

Figure 2:
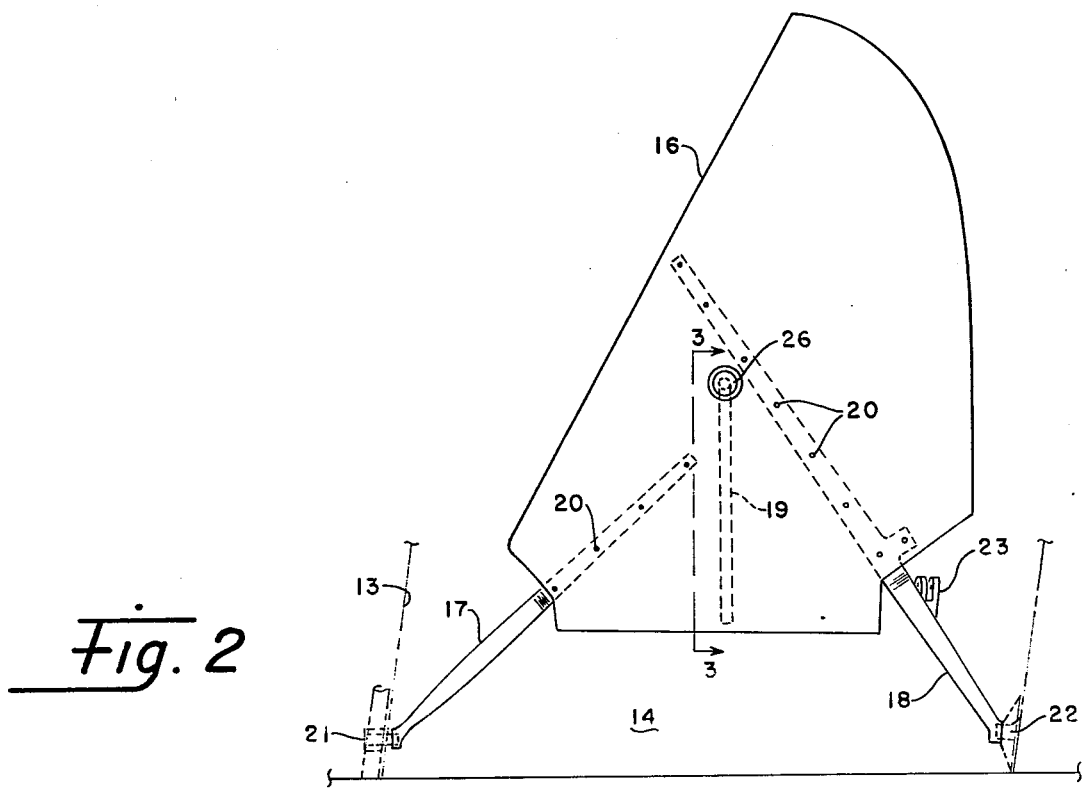
FIG. 2 is a partial elevational schematic of the jump platform of the present invention in the retracted or stored condition.
Figure 3:
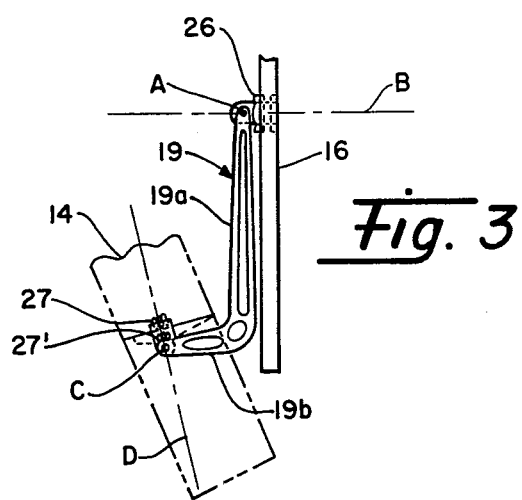
FIG. 3 is a partial sectional view of FIG. 2 taken along line 3—3 illustrating a preferred configuration for the over center linkage member pivotally connecting the jump platform to the door.

Referring now additionally to FIG. 2, an extensible jump platform 16 is supported by rigid members 17 and 18 pivotally connecting platform 16 to fuselage 11 structure near the lower portion of doorway opening 13. As shown in FIG. 3, rigid linkage member 19 pivotally interconnects platform 16 to door 14. Platform 16 may be secured conventionally to members 17 and 18 by means such as bolts 20. Members 17, 18 and 19 preferably have the shape appropriate to support platform 16 in its extended or operative position at a level substantially coplanar with the floor of the aircraft cabin of fuselage 11.

Support member 17 is pivotally mounted to the fuselage structure about a mounting such as bearing support 21. Likewise, support member 18 is pivotally mounted about bearing support 22. Support member 18 has attached thereto intermediate its length a U-shaped bracket 23 for receiving one end of a hydraulic or pneumatic pressure operated cylinder 24 or similar means for controlling the pivotal movement of platform 16 between the stored position as shown in FIG. 2 and the deployed operative position shown in FIG. 1. Cylinder 24 is pivoted at its other end to the structutre of fuselage 11 as indicated in FIG. 1 at bracket 25.

Referring specifically now to FIG. 3, linkage member 19 may generally have the shape of an el and may preferably be pivoted at a first end thereof about bearing assembly 26 journaled into platform 16, and pivoted at the second end about bearing assembly 27 journaled into the structure of door 14. Platform 16 is connected to the inner surface of door 14 using a member 19 including a hinged over center link connection as indicated in FIG. 3 at 27'. This assembly allows the first end portion 19a of linkage member 19 to simultaneously pivot about an axis A substantially parallel to the surface of platform 16, and to rotate about an axis B substantially perpendicular to platform 16. Similarly, the second end portion 19b of linkage member 19 may simultaneously pivot about an axis C and rotate about an axis D at its place of attachment to door 14, bearing assembly 27. Member 19 is sized and configured such that platform 16 is supported thereon in the fully deployed position as suggested in FIG. 1. Portions 19a and 19b are sized such that as platform 16 is rotated outwardly and downwardly into the fully deployed position, the second end portion 19b will pivot about axis C to an over center position depicted in FIG. 1 somewhat beyond alignment with axis D, and will there lock into place as platform 16 contacts portion 19a in the fully deployed position. Door 14 is thereby prevented from inadvertent closing.

When door 14 is closed, platform 16 is in the stored position substantially as shown in FIG. 2, that is, piston 24A of cylinder 24 (shown in FIG. 1) is retracted and support members 17 and 18 and platform 16 are substantially upright. In this condition, door 14 may be closed and latched conventionally using such as latching bayonets 28 operated by means of control handle 29.

In order to deploy platform 16 for its intended use, the latching means 28 for door 14 are first released. Hydraulic or pneumatic pressure supply means (not shown) which control the operation of pressure cylinder 24 is then activated so as to extend piston 24A. The extension of piston 24A causes platform 16 to rotate outwardly beyond the confines of fuselage 11 and downwardly relative to doorway opening 13. Simultaneously with the outward movement of platform 16, support member 19 is free to rotate and pivot about bearing assembly 26 at one end and about bearing assembly 27 at the other end, as described above, so that door 14 is urged open with the outward and downward movement of platform 16. Fully extended to its operative position, platform 16, as shown in FIG. 1, is supported by the fuselage structure through support members 17 and 18 and by door 14 through linkage member 19 and over center link connection at 27'.

In order to close door 14, the hydraulic or pneumatic means may be reversed, thereby retracting piston 24A of cylinder 24. This action pivots portion 19b of member 19 about axis C away from door 14 and from its over center position as platform 16 is lifted off portion 19a of member 19. Pivoting of support members 17 and 18 and linkage member 19 then operate to close door 14 simultaneously with the upward and inward movement of platform 16.

The present invention, as hereinabove described, therefore provides a novel deployable platform for operation in conjunction with a hinged aircraft door. However, it is noted that the combined door and platform configuration described herein may be applied with success to other vehicles, such as trucks or passenger vehicles for varied purposes including cargo loading/unloading and walkway extension or continuity for facilitating pedestrian or wheeled vehicle access thereto. It is further understood that certain modifications to the invention as herein described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A door structure, especially suited for providing ingress or egress to or from the body structure of a vehicle, which comprises:
    a. a door frame defining a door opening in said body structure;
    b. a door, configured to be received by said door frame, and hingedly mounted near said frame for outward swinging movement relative to said door opening and vehicle;
    c. a platform pivotally mounted within said body structure near said door frame for outward pivotal movement between stored and operative positions, in response to outward swinging movement of said door;
    d. a substantially rigid el-shaped connecting member, pivotally interconnecting said platform and door, for substantially simultaneous pivotal movement of said platform with said swinging movement of said door, said member connected at one end to said platform for simultaneous rotation and pivoting about the place of connection to said platform, and at the other end to said door for simultaneous rotation and pivoting about the place of connection to said door;
    e. said connecting member including an over center link interconnecting said pltform and door whereby said link releasably locks said platform and door in said operative position; and
    f. a pressure operated cylinder for controlling said pivotal movement of said platform and said swinging movement of said door.

2. The door structure as recited in claim 1 wherein said platform is configured to extend, in said operative position, beyond the confines of said body structure near said door opening substantially coplanar with the floor of said body structure.

* * * * *

UNITED STATES PATENT AND TRADEMARK OFFICE
CERTIFICATE OF CORRECTION

PATENT NO. : 4,482,113

DATED : November 13, 1984

INVENTOR(S) : John G. Backlund et al

It is certified that error appears in the above-identified patent and that said Letters Patent is hereby corrected as shown below:

Column 3, line 9, "structutre" should be ---structure---.

Column 4, line 53, "pltform" should be ---platform---.

Signed and Sealed this

Sixteenth Day of April 1985

[SEAL]

*Attest:*

DONALD J. QUIGG

*Attesting Officer*   *Acting Commissioner of Patents and Trademarks*